United States Patent [19]

Derderian et al.

[11] 4,207,688

[45] Jun. 17, 1980

[54] PILOT TRAINING SIMULATOR

[75] Inventors: George Derderian, Maitland; Windell N. Mohon, Winter Park; Eugene D. Maldonato; Alfred H. Rodemann, both of Maitland, all of Fla.

[73] Assignee: The United States of America as represented by the Secretary of the Navy, Washington, D.C.

[21] Appl. No.: 841,240

[22] Filed: Oct. 11, 1977

[51] Int. Cl.² .............................................. G09B 9/08
[52] U.S. Cl. .................................... 35/12 N; 358/104
[58] Field of Search .................. 35/12 N, 12 R, 11 A, 35/11 R, 10.2, 13, 25; 272/8, 31; 358/104; 340/324 AD

[56] References Cited

U.S. PATENT DOCUMENTS

| | | | |
|---|---|---|---|
| 3,234,665 | 2/1966 | Sear et al. | 35/12 N X |
| 3,283,418 | 11/1966 | Brewer et al. | 358/104 X |
| 3,427,730 | 2/1969 | Noxon | 35/12 N |
| 3,507,055 | 4/1970 | Claunch et al. | 35/25 |
| 3,580,996 | 5/1971 | Maxey | 35/12 N X |
| 3,895,183 | 7/1975 | Collier | 35/11 A X |
| 3,932,702 | 1/1976 | Shelley et al. | 35/12 N X |
| 3,949,490 | 4/1976 | Derderian et al. | 35/12 N |
| 4,027,403 | 6/1977 | Marsh et al. | 35/12 P X |

Primary Examiner—Vance Y. Hum
Attorney, Agent, or Firm—Richard S. Sciascia; Robert W. Adams

[57] ABSTRACT

A pilot training simulator system is disclosed that simulates a predetermined vehicle and the operational environment pertinent to the vehicle in such manner that the pilot being trained in the system may be responsive to the realistic impressions effected by this combination. Included in the system is a first subsystem for producing a video readout of various terrain and target scenes, a simulated vehicle cockpit second subsystem to which the terrain and target scenes are provided, and a third subsystem for providing a motion picture to the windshield of the simulated vehicle cockpit. A motion generator imparts realistic movements to the first subsystem and simulated vehicle cockpit, and console controls permit the manual operational control of both.

17 Claims, 2 Drawing Figures

PILOT TRAINING SIMULATOR

FIELD OF THE INVENTION

The present invention, in general, relates to simulators and, in particular, is a system which optically simulates the ambient scenery that would or could be encountered and observed by one or more people piloting a predetermined vehicle. In even greater particularity, the subject invention constitutes an improved means for generating several relatively superimposed varying scenes and images which would or could be encountered and observed by a pilot being trained in the simulated cockpit of an aircraft or other vehicle while he is going through the motions of piloting it in accordance therewith.

DESCRIPTION OF THE PRIOR ART

Heretofore, numerous systems have been employed to simulate the environmental scene that would be used in conjunction with other training apparatus, in order to give the person being trained a more realistic feeling as he manipulates whatever other training apparatus is involved. For example, scenic pictures have been projected on simulated screen-like cockpit windshields and side windows by movie projectors, thereby giving the pilot trainee sitting therein the impression that he is piloting an actual aircraft, ship, tank, or other vehicle, as the case may be. Sometimes, photographic slide projectors may be used for such purposes, too. As an example of the latter, U.S. Pat. No. 3,949,490 for Simulator Including Improved Holographic Heads Up Display System by George Derderian and Windell Neil Mohon, issued Apr. 13, 1976, is herewith cited. Disclosed therein is a display simulator which includes a plurality of photographic slide projectors that project light images toward a holographic lens employed as a window to the eye of an observer. The respective intensities of said light images are controlled by light valves that are regulated from a control panel via a suitable servo system.

For many practical purposes, the devices of the prior art, including those mentioned above, are quite satisfactory; however, for some purposes they leave something to be desired, too. Accordingly, for one such purpose, the system disclosed herein was invented, and, for whatever it is worth, it has been found to work quite well.

SUMMARY OF THE INVENTION

Very briefly, the subject invention consists of a pilot training simulator system which incorporates a plurality of subsystems that have been uniquely combined in such manner as to facilitate the simultaneous projection of a realistically simulated ambient environmental scene and a readout or display of a simulated forward looking infrared (FLIR) view of all or a predetermined portion thereof, with or without target object images added thereto, so that both thereof may be observed by a pilot-trainee while he is operating the controls of any given vehicle trainer or simulator in response thereto. In this particular instance, said plurality of subsystems comprises: (1) a film projector and viewing system, wherein scenic pictures are effectively projected onto the cockpit windshield (and side and other windows, too, if so desired) of the particular vehicle trainer involved; (2) a simulated FLIR image generation system and readout therefor; (3) a simulated cockpit of the vehicle in which the pilot-trainee is to be trained; and (4) a programmed motion generator system appropriately interconnecting the aforesaid simulated FLIR image generation system and said simulated cockpit, so that synchronized identical, similar, or other motions will be imparted thereto which represent actual operational conditions of the vehicle being simulated. Consequently, any pilot-trainee (or trainees, instructors, etc.) will receive both optical and tactile impressions or experiences while being trained in the aforesaid simulated vehicle cockpit that compare favorably with those which he would receive in a real vehicle of the type being simulated. Obviously, anything that causes a more realistic simulation of a real situation is to an advantage of the trainee and device operator when training devices are involved; hence, the instant invention is considered to be a very worthwhile advancement in the training simulator art.

It is, therefore, an object of this invention to provide an improved vehicle simulator.

Another object of this invention is to provide an improved means for the training of people to operate various and sundry vehicles without their having to operate the vehicles, per se.

Still another object of this invention is to provide an improved means for teaching people to fly airplanes and helicopters and to pilot ships, tanks, automobiles, trucks, space crafts, submarine vehicles, and the like, with complete safety to the trainee and the particular vehicle involved.

A further object of this invention is to provide an improved means for displaying real or ficticious environments in great detail and with different simulated radiant energy wavelengths and/or characteristics.

A further object of this invention is to provide a means for simultaneously generating a natural scenic image and a simulated forward looking infrared image thereof or portion thereof that are simultaneously displayed in such close spatial dispositions that both thereof may be observed either at the same time or by the mere shifting of the eyes of a person observing them.

Another object of this invention is to provide an improved system for displaying or otherwise reading out with essentially realistic fidelity a plurality of substantially synchronized images, each of which are obtained from a different source, such as, for example, from a photographic film, model board, and the like.

Another object of this invention is to provide an improved simulated forward looking infrared (FLIR) image generator.

Still another object of this invention is to provide an improved simulated forward looking infrared (FLIR) image display system.

Other objects and many of the attendant advantages of this invention will be readily appreciated as the same becomes better understood by reference to the following detailed description, when considered in connection with the accompanying drawing wherein:

DESCRIPTION OF THE PREFERRED EMBODIMENTS

At the outset, it should be understood that the instant invention is intended to facilitate the training of individuals to drive, fly, pilot, or otherwise operate any vehicle, apparatus, or equipment that is or may be made to be compatible therewith. Obviously, it would now be well within the purview of one skilled in the art to make whatever design changes as would be necessary to the invention and/or apparatus or vehicle involved, so as to effect the optimum combination thereof for any given purpose, inasmuch as he would have the benefit of the teachings presented herewith which would make so doing possible. Nevertheless, without limitation, but in order to keep this disclosure as simple as possible, the particular embodiment discussed below will be considered as being an aircraft pilot training simulator system.

Figure 1:
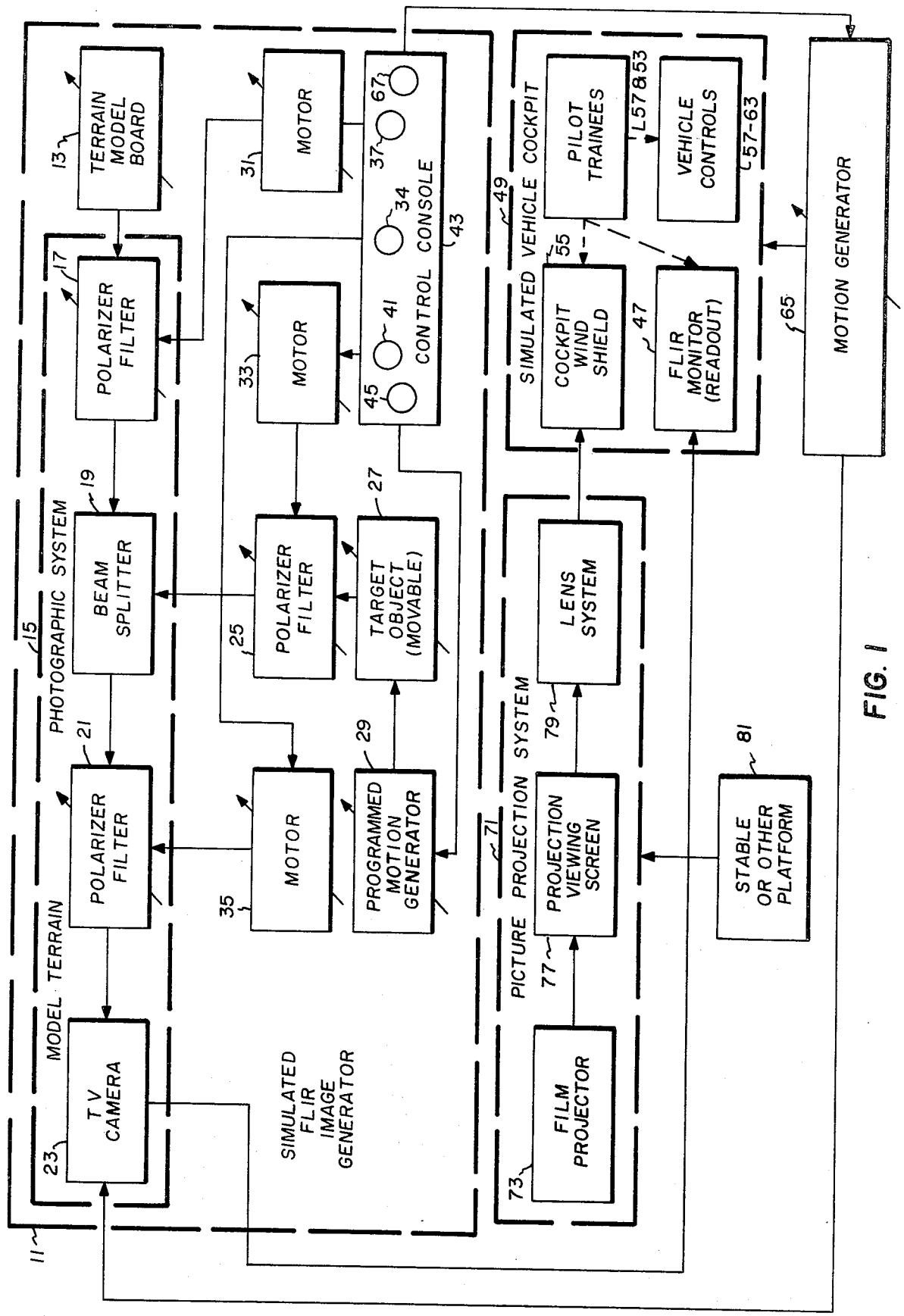
FIG. 1 is a block diagram of a generalized embodiment of the subject invention.
Figure 2:
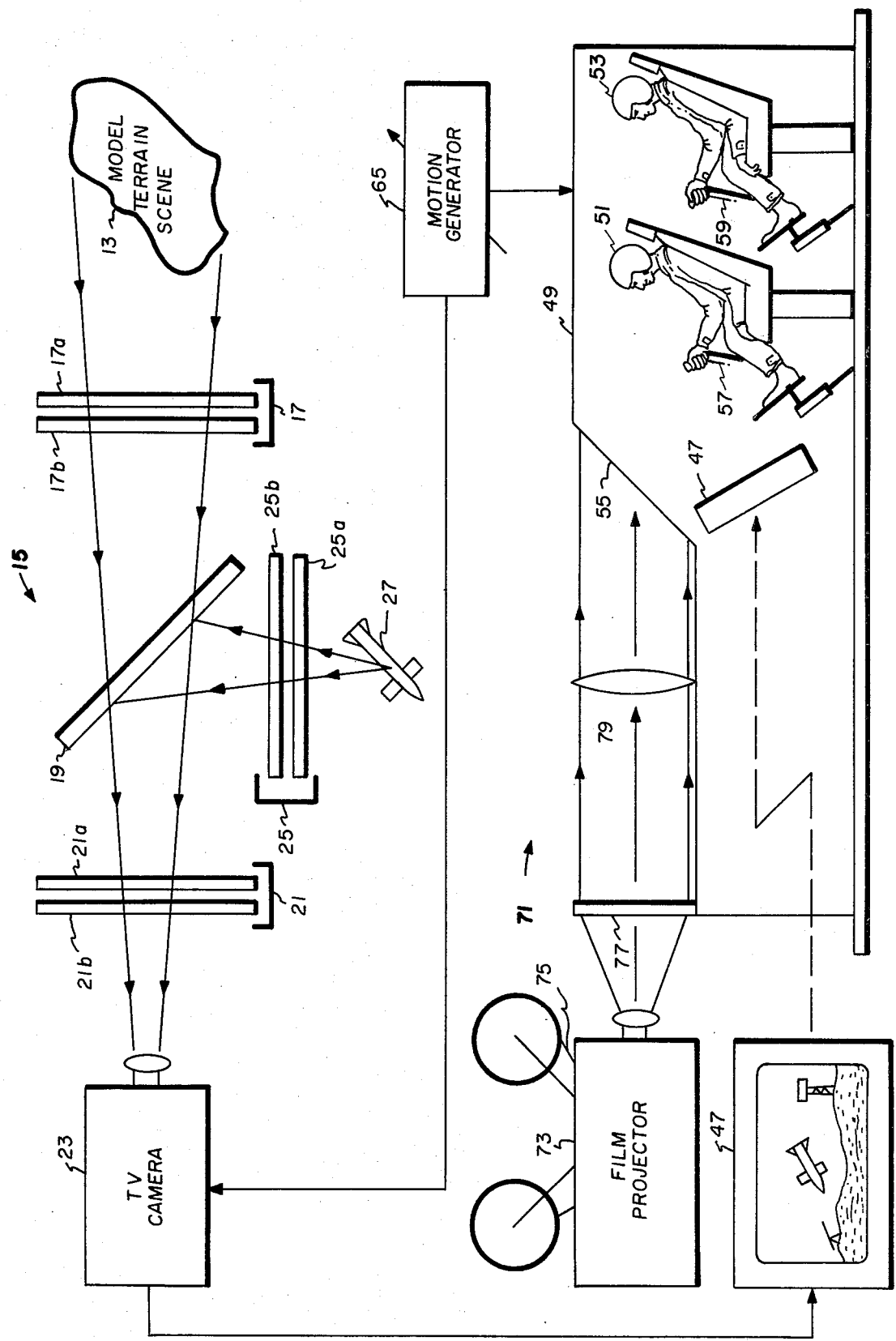
FIG. 2 is a schematic representation of a preferred particularized embodiment of the invention that partially corresponds to but, to some extent, is shown in greater detail than the system of FIG. 1.

Accordingly, reference is now made to FIGS. 1 and 2 of the drawing, wherein like parts will be identified by like reference numerals insofar as possible or practical. A simulated forward looking infrared (FLIR) image generator 11 is shown as including a terrain model board 13 which may be changed, moved, disposed as desired for viewing purposes. Of course, as is conventional with such devices, the terrain shown thereby is that which is to be subsequently displayed in another form, say, in life-size form, miniaturized form, or the like. In this particular case, terrain model board 13 provides a realistic model of a view of the earth over which the pilot-trainee will fly his simulated aircraft during training sessions.

Said model board 13 is observed, sensed, or probed along a first optical or light path by a model terrain photographic system 15 which includes an adjustable polarizer filter 17 which preferably comprises a pair of relatively rotatable polarizing lenses 17a and 17b, which will, in turn, regulate the amount of light passing therethrough, in accordance with the relative rotational disposition of the respective polarizations thereof, as is conventional in the polarized light valve art.

Spatially disposed along the aforesaid first light path and a predetermined design distance downstream from said adjustable polarizer filter 17 is a beam splitter (semi-mirror) 19, and spatially along said first light path and a predetermined design distance downstream from said beam splitter 19 is another adjustable polarizer filter 21 preferably comprising a pair of relatively rotatable polarizing lenses 21a and 21b, which will, in turn, regulate the amount of light passing therethrough, like the aforementioned polarizer filter 17.

A television camera 23 is likewise spatially disposed along said first light path and a predetermined design distance from said polarizer filter 21 for taking motion or other pictures of the terrain portrayed by the aforesaid terrain model board 13 via polarizer filter 17, beam splitter 19, and polarizer filter 21, as will be discussed more fully during the discussion of the operation of the invention presented subsequently. Of course, it should now be readily apparent that light filter 17, beam splitter 19, light filter 21, and television camera 23 constitute the aforementioned model terrain photographic system 15.

As should be evident at this point, controlled relative movement will be required between terrain model board 13 and photographic system 15, in order to simulate the travel of an aircraft within its ambient environment (the simulation of which the model board provides); hence, any suitable, conventional means for effecting such relative movement therebetween—such as, for instance, controllable powered gantries or platforms respectively connected thereto—may be used for such purpose, although the specific structures thereof are not shown to simplify the disclosure of this invention.

Spatially disposed from beam splitter 19 and along a second optical or light path is still another adjustable polarizer filter 25 that preferably comprises a pair of relatively rotatable polarizing lenses 25a and 25b which will permit the regulation of the amount of light passing therethrough in accordance with their relative rotational positions, and spatially disposed upstream along said second light path is a target object 27 of any predetermined type warranted by operational circumstances.

At this time, it may be noteworthy that said second light path intersects the aforesaid first light path at beam splitter 19, thus causing any target object 27 to be reflected toward television camera 23 thereby, as is conventional in the beam splitter art.

In order to move target object 27 as desired during a given training session, a conventional presettable or programmed motion generator 29 is effectively connected thereto, the choice of which is left to the artisan taking into consideration how complex a movement is required therefor for any given training purposes. Of course, target object 27 may be mounted on a fixed position support means (not shown), too, if so desired.

As previously indicated, all of the aforementioned polarizer filters are adjustable in such manner as to permit any amounts of light to pass therethrough, respectively. For such purpose, they may be adjusted manually or respectively by a trio of reversible motors 31, 33, and 35, which, in turn, are respectively controlled by direction and speed control knobs 37, 39, and 41 located on a control console 43 that is or may be operated by an instructor or other person. Likewise, programmed motion generator 29 may be regulated from a control knob 45 located at control console 43, if so desired. Of course, servo systems for effecting such control functions are well known and commercially available, and, hence, they will not be shown in greater detail herein.

Control 45, as previously indicated, may be connected to the aforesaid adjustable motion control generator 29, in order to move target object 27 as desired for training purposes. For such purposes, it may constitute an override control, too.

The output of television camera 23 is, of course, electrical which is connected to the electrical input of a FLIR television monitor 47 (or other readout) which is, in fact, located in the simulated vehicle cockpit 49. Said monitor may be a television receiver, cathode ray tube and associated apparatus, oscilloscope, or any other suitable display that will read out the simulated infrared or other picture of that portion of terrain model board 13 upon which TV camera 23 is sighted.

FLIR monitor 47 should be located within simulated cockpit 49 where it may be easily seen by a pilot-trainee 51 and, perhaps optionally, another pilot-trainee or instructor 53, or anyone else warranted by any given circumstances. Moreover, FLIR monitor 47 should preferably be sufficiently juxtaposed with a windshield 55 of cockpit 49 to be observed either simultaneously therewith by pilot-trainees 51 and 53 or with a minimum of eye and/or head movement thereof, since such observation thereof thereby tends to optimize the training effectiveness thereof for reasons which will become apparent shortly.

Pilot-trainee 51 and pilot-trainee 53 both sit in cockpit 49, as previously mentioned, and, among others not shown, manipulate the normal aircraft controls 57, 59, 61, and 63, which, in turn, are servo-connected to a motion generator 65 that imparts motions to simulated vehicle cockpit 49 in accordance with the handling thereof, with said motions including pitch, yaw, and roll and otherwise being similar to that effected during actual flight by the manipulation of the controls of a real aircraft (or other vehicle).

An optional manual override control 67 may be incorporated in the subject system at control console 43, so as to permit an instructor or other person to give whatever motion to simulated vehicle cockpit 49 as would facilitate the training of the pilot trainees. Hence, control knob 67 is effectively connected to motion generator 65 for such purpose.

A movie projection system 71 projects a motion picture of the terrain over which the trainer vehicle is supposed to be flying, with the pictures thereof ordinarily being similar to those displayed by terrain model board 13. Incorporated therein is a film projector 73 containing motion picture film 75 which projects the pictures thereof along a third optical or light path toward the aforementioned windshield 55 of simulated vehicle cockpit 49. Interposed between film projector 73 and windshield 55 is a viewing screen 77 and a lens system 79. Viewing screen 77 is preferably of the conventional translucent diffuser type which permits the projection of motion pictures on one side thereof that may be seen by the human eye observing the other side thereof, and lens system 79 make the pictures occurring at the observation side of screen 77 appear to come from an "infinite distance" when they are observed by pilot-trainees 51 and 53 through windshield 55. Although only one lens is shown in FIG. 2 to perform said "infinite distance" appearance, it should be understood that any number and any arrangement thereof may be used by the artisan that will effect his desired results, and that so doing may be accomplished without violating the spirit or scope of this invention.

As a general rule, it is necessary or desirable for there to be relative movement between simulated vehicle cockpit 49 and movie projection system 71, so that it will give the pilot-trainees the sensation of travel through their ambient environment. To implement such relative movement, said movie projection system is usually mounted on a stabilized platform 81 which is fixed relative to simulated vehicle cockpit 49.

It might well be noteworthy at this time that all of the individual parts, components, and elements incorporated in this invention are well known, conventional, and commercially available, and, therefore, it is their unique interconnections and interactions that effect the subject invention and cause it to produce the new and improved results stated above. Accordingly, the subject invention constitutes a new and unobvious combination of elements that advances the state of the art, and especially as it is represented by the aforementioned known prior art devices.

Mode of Operation

The operation of the invention will now be discussed briefly in conjunction with both figures of the drawing.

As the pilot-trainee sits in simulated vehicle cockpit 49, he observes the scenic image projected through windshield 55 by film projector 73, viewing screen 77, and optical lens system 79. Of course, the scenic image viewed is that which has been pre-recorded of film 75, as a result of the prior photographing of whatever actual scene as would constitute the desired ambient environmental scene to be used for training purposes. Hence, as film projector runs, it projects such scenic image—in all probability, a motion picture, but may be a still shot or slide, too—on the back of viewing screen 77, which, being a diffuser type screen, shows the picture being projected onto the back side thereof on the front side thereof. That scene is then optically processed by optical lens system 79 to make it appear to the pilot-trainee that it is at a considerable distance—that is, the normal distance for the particular training situation—away from simulated vehicle cockpit 49. The viewing of such simulated distant scene gives the pilot-trainee the feeling, impression, or sensation of operating his aircraft normally while flying it through the air, making landings, navigating it with respect to certain landmarks, etc.

Unfortunately, during actual flight conditions, the amount of sunlight, fog, smog, and other atmospheric conditions sometimes adversely affect visibility and, thus, the piloting of an aircraft; therefore, an infrared system—known as the forward looking infrared (FLIR)—has been developed with displays all or a part of the environmental scene observed by the pilot through his windshield, thereby, in effect, giving him visual assistance. In other words, the pilot may now observe two views of the same scene, one real and one infrared, which gives him a much clearer picture of exactly what he is flying through, where he is flying with respect to earth, other airborne objects, etc. And in real life, such dual views improves piloting conditions considerably. But, in order for a pilot to become proficient in using such FLIR system in conjunction with actual flight scenery, he must practice in either a real or a simulated situation. The subject invention permits his doing the latter with greater safety to pilot and aircraft, with less expense, with more experience acquired in a lesser amount of time, and with an increased variety of operational situations due to the programmability thereof.

That portion of the instant invention defined as being simulated FLIR image generator 11 enables the pilot-trainee to observe images that represent real FLIR scenic images on FLIR monitor 47. To generate such images, television camera 23 is sighted through polarizer filter 21, beam splitter 19, and polarizer filter 17 on terrain model board 13 and along a path thereon that it proportional to the simulated course traveled by vehicle 49. So that there will be effective correspondence between vehicle 49 and camera 23, motion generator 65 provides the proper motions thereto simultaneously. In addition, if so desired, the movements of motion generator 65 may be effectively connected (say, via a servo-mechanism or the like) to vehicle controls 57 through 63 for being controlled thereby. Of course, as previously suggested, vehicle controls 57 through 63 may be overridden at console 43 by manual control 69, likewise connected (say, by servomechanism) to the aforesaid motion generator 65.

Because it is necessary, in most cases, for the motions of television camera 23 to be the same as, similar to, proportional to, or synchronized with simulated vehicle cockpit 49, motion generator 65 is connected to both thereof to provide the appropriate motions thereto. Therefore, the scenes observable from cockpit windshield 55 and FLIR monitor 47 will change in unison accordingly.

Polarizer filters 17 and 21 are used to control the light levels at two locations between terrain model board 13 and camera 23. The amount of light passed by filter 17 is determined by how much model terrain emissivity, temperature, weather, daylight, etc., is required during any given training session.

Because of its reflection by beam splitter 19, the image of target object 27 is also viewed by television camera 23, and it, too, may have its apparent emissivity controlled by polarizer filter 25. Then the entire combined scene has its illuminance level controlled, as desired, by polarizer filter 21.

As previously indicated, each of the aforesaid polarizer filters 17, 21, and 25 has a pair of relatively rotatable polarized lenses (say, with one fixed and the other rotatable with respect thereto). Therefore, the adjustment thereof may be implemented by suitable motor means, such as motors 31, 35, and 33, respectively; and manual control thereof may be effected by means of controls 37, 39, and 41, respectively, of console 43. Likewise, motion generator 29 will—either manually or by predetermined program—adjust the position of target object 27, so that the image thereof may be superimposed on the image of terrain model board 13 with various and sundry relative attitudes, thereby increasing the possible combinations and permutations thereof.

In order to simulate forward looking infrared images for training purposes, it is not necessary that FLIR monitor 47 read out in infrared energy; however, it may be made to do so, if warranted by operational circumstances. Hence, the readout thereof should be considered to be without limitation.

From the foregoing, it may be seen that pilot-trainees may sit in a simulated vehicle cockpit, observe the visible scene in front of them, observe and use forward looking infrared information, and manipulate the vehicle controls in a more optimum manner as a consequence thereof. Thus, the training thereof is facilitated and expedited under circumstances that are more safe and more economical than it otherwise would be.

The arrangement of the various components of the simulated vehicle cockpit would, of course, vary according to the type of vehicle being simulated; consequently, the arrangement of the windshield thereof and the FLIR monitor or readout is left, without limitation, to being selected by the artisan to suit the occasion.

Obviously, many modifications and variations of the present invention are possible in the light of the above teachings. It is, therefore, to be understood that within the scope of the appended claims the invention may be practiced otherwise than as specifically described.

What is claimed is:

1. A pilot training simulator, comprising in combination:

model board means for producing predetermined model scenes;

television camera means spatially disposed from said predetermined model board scenes producing means and sighted along a first predetermined light path therefrom for the optical probing thereof and for producing a video signal representing an image of a predetermined model scene;

means spatially disposed from said model board means and said television camera means for superimposing a model target scene upon said predetermined model board scenes in such manner that both of said scenes may be sighted on simultaneously by said television camera means;

a simulated vehicle cockpit having a windshield and controls which correspond to those of the vehicle whose cockpit is being simulated;

means contiguously disposed with said windshield, located within said simulated vehicle cockpit, and connected to the output of said television camera means for displaying said predetermined model scene image in response to the video signal produced thereby; and means spatially disposed from the windshield of said simulated vehicle cockpit for projecting a visible motion picture therethrough that includes the aforesaid predetermined model scene image.

2. The device of claim 1, wherein said pilot training simulator comprises an aircraft simulator effective for teaching pilots how to fly the aircraft simulated thereby.

3. The device of claim 1, wherein said pilot training simulator comprises a marine vehicle simulator effective for teaching pilots to operate the marine vehicle simulated thereby.

4. The device of claim 1, wherein said pilot training simulator comprises a ship simulator effective for teaching pilots how to maneuver the ship simulated thereby.

5. The device of claim 1, wherein said pilot training simulator comprises a land vehicle simulator effective for teaching pilots how to operate the land vehicle simulated thereby.

6. The device of claim 1, wherein said pilot training simulator comprises a tank simulator effective for teaching pilots how to maneuver the tank simulated thereby.

7. The device of claim 1, wherein said means contiguously disposed with said windshield, located within said simulated vehicle cockpit, and connected to the output of said video signal producing means for displaying said predetermined model scene image in response to the video signal produced thereby comprises a monitor having a cathode ray tube readout.

8. The device of claim 1, further characterized by means spatially interposed between the aforesaid predetermined model board scenes producing means and said television camera means and along said predetermined first light path therebetween for filtering the light of said first light path in a predetermined manner.

9. The device of claim 1, wherein said means spatially disposed from the windshield of said simulated vehicle cockpit for projecting a visible motion picture therethrough comprises a motion picture projection system.

10. The device of claim 9, wherein said motion picture projection system comprises:

a film projector and a film projected thereby;

a viewing screen spatially disposed from said film projector, said viewing screen adapted for receiving projected light images on one side thereof and portraying them on the other side thereof; and an optical system spatially disposed between said viewing screen and the windshield of the aforesaid simulated vehicle cockpit for making the light images portrayed by said viewing screen appear to come from an infinite distance when observed through said windshield.

11. The invention of claim 1, further characterized by means connected to said simulated vehicle cockpit and said controls thereof and to said television camera means for imparting predetermined movements to said cockpit and to said television camera means in predetermined response to said controls.

12. The invention of claim 1, further characterized by means effectively connected to said visible motion picture projecting means for the stabilization thereof at a predetermined position and attitude.

13. The invention of claim 1, further characterized by synchronization means connected to said simulated vehicle cockpit controls, to said simulated vehicle cockpit, to said television camera means, and to said visible motion picture projecting means for simultaneously relatively displacing said television camera means with respect to said model board means, and said simulated vehicle cockpit with respect to said visible motion picture projecting means, in response to operation of said simulated vehicle cockpit controls.

14. The device of claim 13, wherein said synchronization means comprises:
    a motion generator connected to said simulated vehicle cockpit controls, to said simulated vehicle cockpit, and to said television camera means; and
    a stable platform connected to said visible motion picture projecting means.

15. A pilot training simulator, comprising in combination:
    a television camera adapted for receiving images along a first optical path and for producing a signal indicative thereof;
    a first adjustable light filter spatially disposed upstream from said television camera along said first optical path;
    a beam splitter spatially disposed upstream from said first adjustable light filter along said first optical path;
    a second adjustable light filter spatially disposed upstream from said beam splitter along said first optical path;
    a third adjustable light filter spatially disposed upstream from said beam splitter along a second optical path;
    a pair of predetermined models spatially disposed upstream from said second and third adjustable light filters along said first and second optical paths, respectively for supplying the images received by the aforesaid television camera;
    a simulated vehicle cockpit capable of pitch, yaw, and roll movements having a forward looking window and attitude controls;
    means connected to said simulated vehicle cockpit and receiving the signal for displaying in said cockpit the images received by said television camera;
    a film projector adapted for projecting pictures along a third optical path that extends through the forward looking window of said simulated vehicle cockpit;
    a diffuser type viewing screen spatially disposed downstream from said film projector along said third optical path;
    lens means spatially disposed downstream from said viewing screen and upstream from the aforesaid forward looking window of said simulated vehicle cockpit along said third optical path for giving the downstream side of said viewing screen and any images portrayed thereby the appearance of being located a substantially infinite distance from the aforesaid simulated vehicle cockpit; and
    a motion having a plurality of inputs and a plurality of outputs, with one of the inputs thereof connected to the controls of said simulated vehicle cockpit, and with a pair of the outputs thereof connected to the aforesaid simulated vehicle cockpit and television camera, respectively.

16. The invention of claim 15, further characterized by a stable platform effectively connected to said film projector, said viewing screen, and the aforesaid lens means for the supporting thereof at attitudes and positions that are fixed relative to said movable simulated vehicle cockpit.

17. The invention of claim 15, further characterized by:
    a first reversible motor connected to said first adjustable light filter for effecting the adjustment of the light transmission therethrough; and
    a second reversible motor connected to said second adjustable light filter for effecting the adjustment of the light transmission therethrough.

* * * * *